United States Patent [19]
Chang

[11] Patent Number: 5,890,383
[45] Date of Patent: *Apr. 6, 1999

[54] GEARSHIFT LEVER LOCKING DEVICE

[76] Inventor: Martin Ming Yang Chang, 16644 E. Surrey Pl., Hacienda Heights, Calif. 91745

[*] Notice: The term of this patent shall not extend beyond the expiration date of Pat. No. 5,689,982.

[21] Appl. No.: 782,611

[22] Filed: Jan. 13, 1997

[51] Int. Cl.$^6$ .............................. G05G 5/06; F05B 65/12; B60R 25/06
[52] U.S. Cl. ............................................... 70/247; 70/202
[58] Field of Search ........................... 70/247, 201, 202, 70/203, 211, 212, 237, 238

[56] References Cited

U.S. PATENT DOCUMENTS

| | | | |
|---|---|---|---|
| 1,126,781 | 2/1915 | Kehde | 70/201 |
| 1,158,860 | 11/1915 | Sammons | 70/254 |
| 1,185,285 | 5/1916 | Brewster | 70/247 |
| 1,309,925 | 7/1919 | Welsh | 70/202 |
| 1,320,800 | 11/1919 | Saxton et al. | 70/201 |
| 1,330,117 | 2/1920 | Irish | 70/202 |
| 1,388,035 | 8/1921 | Gorden | 70/201 |
| 1,402,150 | 1/1922 | Napoli | 70/201 |
| 4,993,248 | 2/1991 | Nordberg | 70/202 |
| 5,473,918 | 12/1995 | Hixon | 70/202 |
| 5,555,755 | 9/1996 | Padrin | 70/247 |

Primary Examiner—Darnell M. Boucher

[57] ABSTRACT

This invention relates to the improvement in an anti-theft device for the gearshift lever of an automotive vehicle equiped with an automatic transmission. This device comprises a sleeve surrounding and firmly engaging a lower portion of the gearshift lever extending vertically upwardly through a slot opening of the flooorboard of the vehicle and is provided with a L-shaped latching member having a vertical arm being pivotally mounted in the sleeve and a horizontal arm which can be lowered into, concealed within and occupying the slot and a locking means having a semi-circular shaft partially intersecting the pivotal joint or hinge of the latching member thereof. The vertical arm is provided with a pair of arcuate notches at the hinge which can be brought to engage the shaft at either the lowered and a raised and upright position respectively. In either of these positions, the latching member can be locked therein by the turn of the shaft to provide the locking and unlocking functions of the anti-theft device.

2 Claims, 1 Drawing Sheet

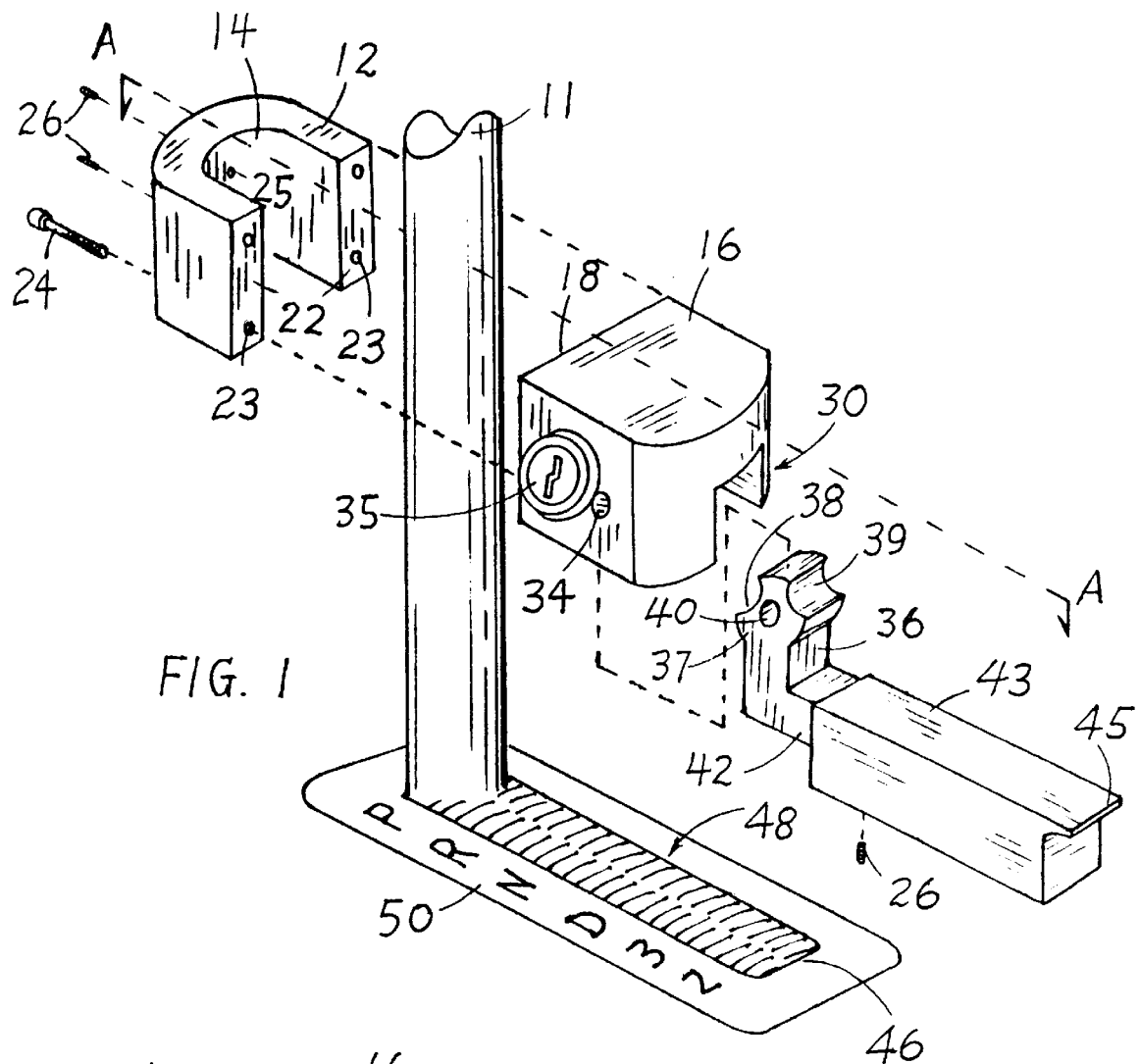
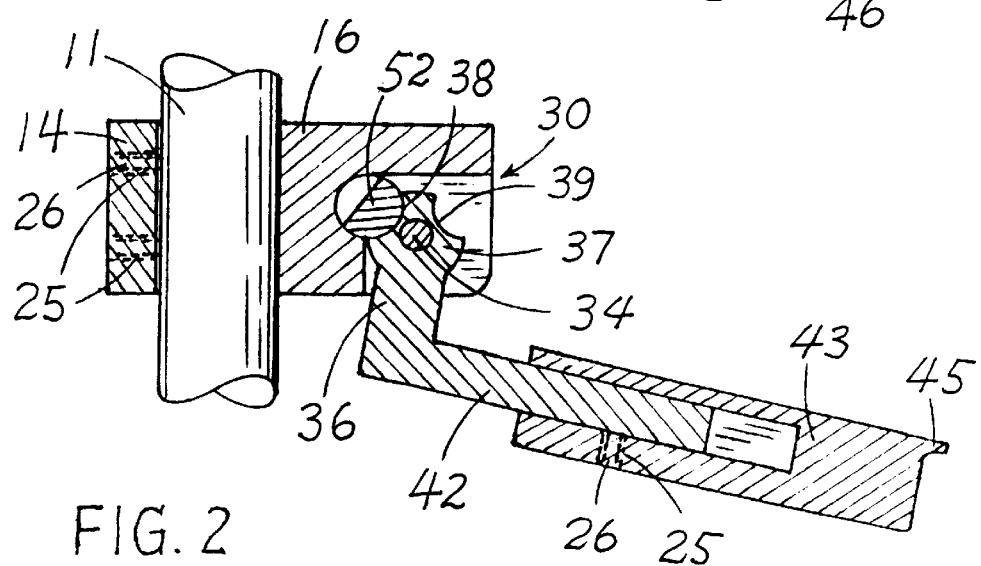

GEARSHIFT LEVER LOCKING DEVICE

FIELD OF INVENTION

The present invention relates to a gearshift lever locking device for automobiles and more specifically to an improvement of a gearshift lever locking device for automobiles equiped with an automatic transmission which was described in the Application for Pat., Ser. #08/437,420, filed May 12, 1995, now abandoned.

BACKGROUND OF THE INVENTION

Gorden U.S. Pat. No. 1,388,035 shows a locking device for the gearshift lever of an automobile. The device comprises basically a sleeve adapted to be securely fastened to the gear lever, a pivotal arm or latching member adapted to be received in a keeper socket away from the gear lever, and a lock for locking the arm in the socket to hold the lever against the movement at the neutral position for the anti-theft purpose. The device is a relatively simple and straight forward structure, which appears seemingly effective and easy in operation according to Gorden's description. But in practices, this device has serious deficiencies. First, because the socket is an independent structure from the locking device, it must be attached firmly to somewhere else in the body away from the lever. Additional labor is therefore required for the installation as well as holes or punctures must be made onto the body of the vehicle. This may be very difficult for the owner of the vehicle to accept. Secondly, the far reaching distances between the arm, the keeper socket and the lever creates a very large gap which allows foreign matters to be inserted therein and pry the corresponding structure. Thirdly, the insertion of the terminal of the latching arm to the keeper socket is through a pivotal motion of the arm while both the socket and the sleeve are held stationary. In this respect, the socket provides no resistance for the terminal to pivotally move in, therefore, it will not provide any resistance for same to pivotally move out, other conditions unchanged. The only mechanism to keep the terminal in the socket against pivotal movement is the tumbler at the far and hinge end of the arm and this can be easily overcome by prying with a cross bar or any foreign matter at the terminal end of the arm. Once this terminal is pryed out of the socket, the entire anti-theft functioning of this device is defeated.

I have found that the above deficiencies of Gorden's teaching can be overcome by eliminating the socket structure as the receiving vehicle, employing the existing slot opening for this purpose and by replacing the straight latching arm with a L-shaped latching member matching in size and shape of same slot which can be lowered and conceived therein to perform the anti-theft function. The positioning of the lever is also changed from the "neutral" to the "park" position in order to accomodate these modifications. These and other improvements of the structure will become apparent following the specifications and drawings of this application for patent.

SUMMARY OF THE INVENTION

The present invention provides an improved locking device for the gearshift lever of an automotive vehicle equipped with an automatic transmission, wherein the gear lever extends essentially vertically upwardly through a slot on the central console of the vehicle. The device comprises a sleeved body surrounding a lower portion of the lever above the slot, a L-shaped latching member pivotally mounted therein and a locking means. The latching member has a short, vertical arm connected to the pivot and a long, horizontal arm matching in size and shape of the slot. The orientation of the body, the latching member and the gear lever is such that the horizontal arm of the latching member will engage and occupy essentially the entire spacing of the slot when the latter is placed in the lowered position and can be locked therein to hold the lever at the "park" position. The latching member may also be raised from the slot and locked at the stand by position to resume the normal operation of the lever. It is simple and easy to install and operate, wherein mechanical anti-theft device is achieved for passenger cars equipped with automatic transmission.

The first object of the present invention is therefore to provide a mechanical anti-theft device for an automobile equipped with a central console type of automatic transmission.

The second object of the invention is to provide an anti-theft device which is small and simple in structure, convenient in operation, easy in storage, and difficult to tamper with.

A further object of this invention is to provide an anti-theft device for the automobile which is easily installed to the vehicle.

These and other objects and advantages of the invention will become apparent from the detailed descriptions and the accompanying drawings.

BRIEF DESCRIPTION OF THE DRAWINGS

FIG. 1 is an exploded view of an anti-theft device shown in relation to a portion of the gearshift lever and the slot opening of the central console.

FIG. 2 is a cross-section view of the assembled anti-theft device taken along section line A—A of FIG. 1.

DETAILED DESCRIPTION OF THE PREFERRED EMBODIMENTS

Referring to the drawings, FIGS. 1 and 2 show a locking device which is adapted to be attached to the gearshift lever 11 of a car (not shown). The device basically comprises two portions together with appropriate attachments, a U-shaped sleeve 12 having a U-shaped channel 14 and a mating portion or main body 16 having a flat vertical side 18 adapted to mate with flat ends 22 on the side of sleeve 12 opposite from the curved portion thereof. An outer surface of the main body 16 is also preferably curved as shown. The U-shaped sleeve 12 has four horizontal holes 23 whose outer ends are enlarged and countersunk. A bolt 24 is adapted to be received in each of the holes 23. The bolts 24 are respectively adapted to threadedly engage with threaded holes (no shown) in the flat vertical side 18 of the body 16 to closely surround the gear lever 11 thereof. The U-shaped sleeve 12 is also provided with a pair of vertically spaced holes 25 in which a pair of set screws 26 are threadedly received. When the locking device is properly positioned on the gear lever 11, the set screws 26 are tightened to lock the body 16 in position.

The body block 16 has a concaved opening 30 whereby a L-shaped latching member 32 is mounted by a pivot 34 in positioning parallel to a locking member 35 therein. The latching member 32 has a short, and vertical arm 36 whose upper end is enlarged into a circular hinge 37 which has a pair of arcuate notches 38, 39 on the periphery and a hole 40 at the center for mounting to the pivot 34. The latching member 32 also has a horizontal arm 42 which extends into a mating rectangular sheath 43 matching in size and shape of the slot 48 to form a telescopingly extensible structure. A set screw 26 is also provided on a bottom side of the sheath 43 to attach same securely to arm 42, once the proper length of the horizontal arm is determined. A thin and short extrusion lip 45 is also provided at the far end of the sheath 43 to allow same to sit on top of the edge 46 of slot 48. The lock 35 is composed of a key-operated cylinder whose inner end is provided with a semi-circular shaft extension 52 which intersects partially with periphery of hinge 37. The orientation of the notches 38, 39 and the shaft 52 is such that when the arm 42-43 is placed in the lowest position inside the slot 48, the shaft 52 will engage notch 38. When arm 42-43 is raised to the uppermost or upright position, the shaft 52 will engage notch 39. A turn of the lock 35 to a "locked" position will move the shaft 52 to engage with the notch 38 or notch 39 and lock the arm 42-43 in the respective positions. On the other hand, turning the lock 35 to an "unlocked" position will move shaft 52 out of the intersection with the it hinge 37 which will unlock the arm 42-43 so as to free same capable of moving pivotally in and out of the slot 48.

When the anti-theft device is installed properly, the horizontal arm 42-43 can be lowered into the slot 48 and for the most part conceived therein. The lock 35 can then be switched to the "locked" position to have the semi-circular shaft 52 engaged to notch 38 and lock the movement of the hinge 37 when the L-shaped latching member 32 in the slot 48. On the other hand, when the lock 35 is turned to the "unlocked" position, the hinge 37 is released and the arm 42-43 can be raised manually to the upright position. The second notch 39 will come to the intersection with the shaft 52. A switch of the locking member 35 to the "locked" position will now put the anti-theft device to the "stand by" condition. In this way, the gearshift lever 12 is free to perform its normal function.

To insure that the sleeved body 12-16 and the associated latching member 32 are tamper proof, the holes 23 and 25 are filled in at the ends with some suitable alloy or other sealants which would be extremely difficult to remove or drill out. Also, the main components, the U-shaped sleeve 12, the body 16 and the latching member 32 are preferably made out of aluminum alloy #319 which is extremely difficult to grind or saw.

When the driver of the vehicle wishes to lock his gearshift lever in the "park" position, he first unlocks the locking member 35. Then, he lowers the arm 42-43 into the slot 48 until the lip 45 sits on the edge 46. At this time, the driver may turn the locking member 35 to the "locked" position so that the shaft 52 is received in the notch 38. The driver can then remove the key from the lock. The gear lever is now locked in the "P" position. The vehicle is protected against theft by this mechanical locking device.

To unlock the gear lever 11, the driver inserts the key in the lock 35 and turn the same until the shaft 52 is no longer received in the notch 38 (i. e., the unlocked position). At this time, the latching member 32 is free to be moved and can then be lifted from the slot 48 to the upright position. Then, a turn of the key to the locked position will have the shaft 52 engaged in the notch 39. The latching member 32 is now locked in the "stand by" position to resume the normal function of the gear lever 11. The key is now easily withdrawn from the lock 35.

The installation of this device is also very easy. With the latching member 32 locked at notch 38 (i.e., the lowest position), the U-shaped sleeve 12 and main body 16 are placed to the lower portion of the gear lever 11 (which is set at "P" position) and four bolts 28 are screwed in until sleeve 12 and body 16 are firmly and completely closed up. The arm 42-43 is then placed into the slot 48 until the lip 45 sits on top of the edge 46 (the length of the arm 42-43 is adjusted at this time so that the arm can be lowered easily and smoothly into the slot and the lip 45 can sit adequately over the edge 46). Finally, the set screws 26 of the sleeve 12 are tightened firmly against the lever 11 to complete the installation. The latching member 12 may then be unlocked and placed in the stand by position to resume the normal operation of the gear lever 11. Alloy or other sealants may be applied at this stage to tamper proof the device. No hole is required to drill through on the car. None of any storage space is needed for putting away this anti-theft device. As the most portion of the latching member 32 is lowered into and conceived by the slot 48 and the lip 45 is thin and short, there is essentially no room available for prying same out of the working condition.

Thus, a mechanical locking device for a passenger car is provided, which can lock the gear lever at the "P" position. The device is small and simple in structure, easy in installation, convenient in operation and storage, and difficult to tamper with, fulfilling all objects of the present invention.

Whereas, the present invention has been described in particular relation to the drawings attached thereto, other and further modifications, apart from those shown or suggested herein, may be made within the spirit and scope of this invention.

I claim:

1. An anti-theft device for a gearshift lever of an automotive vehicle equipped with an automatic transmission, wherein said gearshift lever extending essentially and vertically through a slot on a floorboard of said automotive vehicle, said anti-theft device comprising:

a sleeve body adapted to surround and firmly engage a lower portion of said gearshift lever, wherein said sleeve body comprises a U-shaped portion having a U-shaped channel for surrounding said gearshift lever and a mating main body having a flat vertical side and a concaved spacing, wherein said U-shaped portion has a curved portion on one side thereof and a pair of flat ends on a side opposite from said curved portion, and said flat ends are adapted to mate with said flat vertical side of said main body;

means for mounting said sleeve body firmly to said gearshift lever of said automotive vehicle;

a L-shaped latching member, which is adapted to be engaged into and to occupy said slot, comprising a vertical arm and a horizontal side arm, wherein said vertical arm is pivotally mounted in said concaved spacing of said main body and said horizontal side arm is extended from said main body for a predetermined length, said vertical arm having a circular hinge mounted on a pivot of said main body and a first and a second arcuate notch provided on a periphery of said circular hinge, said horizontal side arm being adapted to be received in said slot when said latching member is lowered therein; and a locking means adapted to lock and unlock a movement of said latching member when said gearshift lever is placed at a "parking" position, wherein said locking means has a semi-circular shaft extension partially intersecting said periphery of said circular hinge of said latching member, and that an orientation of said first and second notches and said shaft extension of said locking means is provided in such a manner that said first notch engages said shaft extension for locking said latching member in position when said horizontal side arm is lowered into said slot, and said second notch engages said shaft extension when said horizontal side arm is raised from said slot to a standby position, whereby when said latching member is lowered into said slot and locked therein by said locking means, said gearshift lever is blocked by said latching member in order to prevent said automotive vehicle from unauthorized use, and said latching member is adapted to be raised from said slot and locked by said locking means to said standby position to allow operation of said gearshift lever.

2. An anti-theft device as recited in claim 1 wherein said horizontal side arm comprises an inner rectangular column and a mating sheath structure telescopingly adjustable in length for occupying an opening spacing of said slot, said sheath structure having an extrusion lip provided at a far end thereof and a set screw mounted in a bottom side of said sheath structure adapted for a longitudinal adjustment, whereby said horizontal side arm is adapted to be lowered smoothly into said slot with said extrusion lip sitting adequately to an edge of said slot.

\* \* \* \* \*